United States Patent [19]
Bhuva et al.

[11] Patent Number: 5,677,703
[45] Date of Patent: Oct. 14, 1997

[54] DATA LOADING CIRCUIT FOR DIGITAL MICRO-MIRROR DEVICE

[75] Inventors: Rohit L. Bhuva, Plano; James L. Conner, Rowlett; Michael J. Overlauer, Plano; William R. Townson, Coppell, all of Tex.

[73] Assignee: Texas Instruments Incorporated, Dallas, Tex.

[21] Appl. No.: 369,606

[22] Filed: Jan. 6, 1995

[51] Int. Cl.$^6$ .................................................. G09G 3/34
[52] U.S. Cl. .............................. 345/84; 345/98; 345/100
[58] Field of Search .............................. 345/84, 85, 98, 345/99, 100, 189, 190, 191, 197, 198

[56] References Cited

U.S. PATENT DOCUMENTS

| | | | |
|---|---|---|---|
| 4,746,915 | 5/1988 | Sekiya | 345/197 |
| 4,910,687 | 3/1990 | Butler et al. | 345/191 |
| 4,922,241 | 5/1990 | Inoue et al. | 345/98 |
| 4,956,610 | 9/1990 | Galm et al. | 324/425 |
| 5,017,914 | 5/1991 | Uchida et al. | 345/98 |
| 5,162,786 | 11/1992 | Fukuda | 345/100 |
| 5,170,158 | 12/1992 | Shinya | 345/98 |
| 5,307,085 | 4/1994 | Nakamura | 345/99 |
| 5,418,547 | 5/1995 | Mizukata et al. | 345/98 |

*Primary Examiner*—Steven Saras
*Attorney, Agent, or Firm*—Robert C. Klinger; James C. Kesterson; Richard L. Donaldson

[57] ABSTRACT

A digital micro-mirror device (20) for imaging applications, having an array (21) of mirror elements for forming the image, and having data loading circuitry (22, 23) for loading data for addressing the mirror elements. The data loading circuitry (22, 23) has a row of shift registers (23), which receive data and pass the data to latches (22). Each output of the shift registers (23) is connected to a number of latches (22). For loading a row of data, the row is divided into portions, and the shift registers (23) receive the row of data in sequential portions. It delivers each portion to a different set of latches, each set comprised of a latch from each shift register output. Each set of latches holds its portion of the row of data on bit-lines while the remaining portions of the row are input to the shift registers (23) and passed to other sets of latches (22).

19 Claims, 2 Drawing Sheets

DATA LOADING CIRCUIT FOR DIGITAL MICRO-MIRROR DEVICE

TECHNICAL FIELD OF THE INVENTION

This invention relates to micro-mechanical devices, and more particularly to circuitry for loading data to a digital micro-mirror array.

BACKGROUND THE INVENTION

A digital micro-mirror device (DMD), sometimes referred to as a deformable micro-mirror device, is a micro-mechanical device manufactured using integrated circuit techniques. It may be used to form images, and has been used in both display and printing applications.

DMDs used for imaging applications such as printing and display, have arrays of thousands of tiny tilting mirrors. Light incident on the DMD is selectively reflected or not reflected from each mirror to the image plane. Each mirror is attached to one or more hinges mounted on support posts, and spaced by means of an air gap over underlying address circuitry. The address circuitry includes a memory cell associated with each mirror. Each memory cell stores a 1-bit data value, which determines the state of an applied electrostatic force applied to the mirror. This electrostatic force is what causes each mirror to selectively tilt.

For imaging applications, the DMD memory cells must be loaded with huge volumes of data at fast data rates. For this purpose, DMD devices have special data loading circuitry, which permits an entire row of data to be received into a row of shift registers, and then passed down bit-lines of the mirror array, with the proper row being selected with a row decoder. As data input bandwidth demands increase, there is a corresponding need for faster and more efficient loading methods.

SUMMARY OF THE INVENTION

One aspect of the invention is a spatial light modulator (SLM), with improved data loading circuitry. The SLM has an array of pixel-generating elements, which are each individually addressable with an electrical signal corresponding to the state of a bit of input data. A row of shift registers sequentially receives portions of a row of input data. Each output line of the shift registers is in data communication with a number of latches, such that each output line may pass the same data bit to different latches. Each latch is in data communication with a different column of pixel-generating elements by means of a bit-line. A row decoder selects which row of the SLM array is to receive each row of data.

The latches are arranged in sets, with each latch connected to a shift register output belonging to a different set of latches. Thus, where there are n latches connected to each shift register output, there are n sets of latches. Each set of latches receives one portion of the row of input data. For each portion, the set of latches to be loaded is enabled. These latches hold their data on a corresponding bit-lines, while the other sets of latches are passed their data. In this manner, the loading capacity of the row of shift registers increases by a factor corresponding to the number of latches connected to each shift register output.

An advantage of the invention is that the length of the row of shift registers required for loading data to a DMD device is significantly reduced. The result is a reduction in the number of transistors required for the shift registers. The reduction of the transistor count is important because, in the case of a shift register, a defect renders the entire device defective. The reduced transistor count also reduces the cost of the device.

DETAILED DESCRIPTION OF THE INVENTION

The following description is in terms of a DMD-type spatial light modulator (SLM), which has a memory cell associated with each mirror element of an array. As explained below, the memory cells are loaded on a row-by-row basis, using a row of shift registers that delivers the data to latches, which hold the data on bit-lines down columns of the array. The invention is directed to reducing the number of shift registers by using "stacks" of latches interposed between the shift registers and the bit-lines.

However, the invention is not limited to DMDs, and could be used with other types of SLMs that use a similar approach to loading data. In the case of a DMD, each pixel of the image is created with one or more "mirror elements", whereas in the case of an SLM, a more general term would be "pixel-generating elements".

Figure 1:
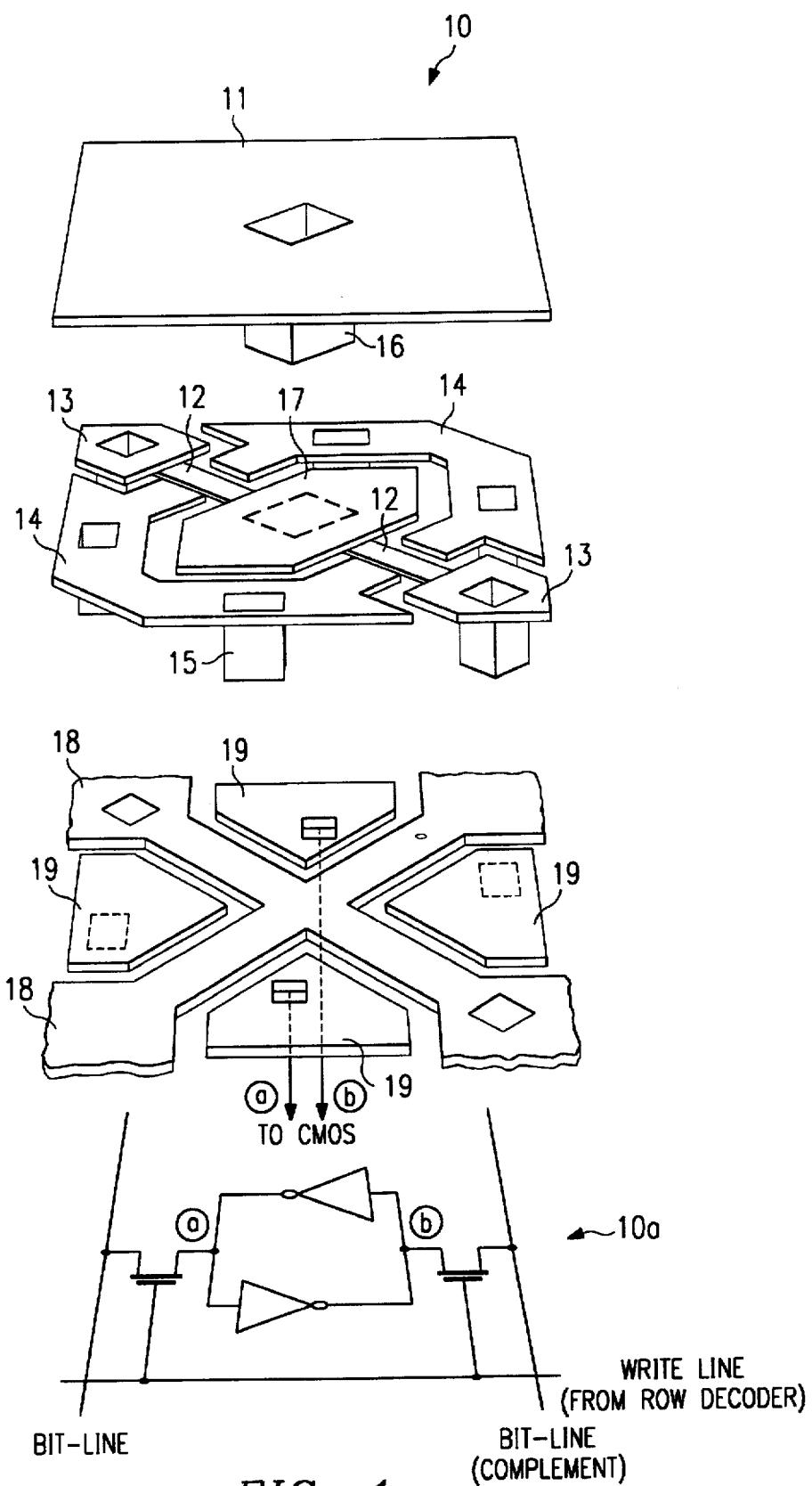
FIG. 1 is an exploded perspective view of a hidden-hinge type mirror element used in a digital micro-mirror device (DMD), with data loading connections in accordance with the invention.

FIG. 1 is an exploded perspective view of a single mirror element 10 of a DMD. For purposes of example, mirror element 10 is a hidden-hinge type. As with other DMD designs, the hinges 12 are supported on support posts 13. Additionally, address electrodes 14 are supported by electrode posts 15 on the same level as hinges 12 and hinge support posts 13. A mirror 11 is fabricated above the hinge/electrode layer and is supported by a mirror support post 16.

Mirror support post 16 is fabricated over a landing yoke 17. Landing yoke 17 is attached to one end of each of the two hinges 12, which are torsion hinges. The other end of each hinge 12 is attached to a hinge support post 13. The hinge support posts 13 and electrode posts 15 support the hinges 12, address electrodes 14, and landing yoke 17 over a control bus 18 and address pads 19. When mirror 11 is tilted, the tip of the landing yoke 17 contacts the control bus 18. The control bus 18 and landing pads 19 have appropriate electrical via contacts to a substrate of address circuitry, which is typically fabricated within the substrate using CMOS fabrication techniques.

The address circuit of each mirror element 10 includes a memory cell 10a. In FIG. 1, the memory cell 10a is static random access memory (SRAM) cell, manufactured with CMOS techniques. As explained below, each memory cell 10a is loaded with data passed down a pair of bit-lines that carry the output of a latch and its complement. Rows of memory cells 10a are enabled with a row enable signal. However, in other embodiments, memory cells 10a could be dynamic memory cells. U.S. Pat. No. 5,670,977, entitled "Single Bit-Line Memory Cell for Spatial Light Modulator", describes a memory cell that receives its data on a single bit-line, and that could be used in place of the memory cell 10a illustrated in FIG. 1.

In the example of this description, there is a one-to-one correspondence between memory cells 10a and mirror elements 10. However, in other embodiments, groups of mirror elements 10 might share a memory cell 10a. These shared memory cells are a part of a "memory multiplexed" data loading method described in U.S. patent Ser. No. 08/300,356, entitled "Pixel Control Circuitry for Spatial Light Modulator", assigned to Texas Instruments Incorporated and incorporated by reference herein. The invention is useful regardless of whether it is used to load multiplexed or non-multiplexed memory cells.

Another type of mirror element 10 is the torsion beam type, whose hinges are not hidden but rather extend from opposing sides of the mirror. Still other types of DMDs are cantilever beam types and flexure beam types. Various DMD types are described in U.S. Pat. No. 4,662,746, entitled "Spatial Light Modulator and Method"; U.S. Pat. No. 4,956,619, entitled "Spatial Light Modulator"; U.S. Pat. No. 5,061,049 entitled "Spatial Light Modulator and Method"; U.S. Pat. No. 5,083,857 entitled "Multi-level Deformable Mirror Device"; and U.S. Pat. No. 5,583,688, entitled "Improved Multi-Level Digital Micromirror Device". Each of these patents is assigned to Texas Instruments Incorporated and each is incorporated herein by reference.

In operation for imaging applications, a light source illuminates the surface of the DMD. A lens system may be used to shape the light to approximately the size of the array of mirror elements 10 and to direct this light toward them. The mirror support post 16 permits mirror 11 to rotate under control of hinges 12. Mirror 11 rotates in response to an electrostatic force caused by application of an appropriate voltage to an address electrode 14.

Voltages based on data in the memory cells 10a of the underlying CMOS circuit are applied to the two address electrodes 14, which are located under opposing corners of mirror 11. Electrostatic forces between the mirrors 11 and their address electrodes 14 are produced by selective application of voltages to the address electrodes 14. The electrostatic force causes each mirror 11 to tilt either about +10 degrees (on) or about −10 degrees (off), thereby modulating the light incident on the surface of the DMD. Light reflected from the "on" mirrors 11 is directed to an image plane, via display optics. Light from the "off" mirrors 11 is reflected away from the image plane. The resulting pattern forms an image. Various modulation techniques can be used to form greyscale images, and color images can be created with filtered light.

In effect, the mirror 11 and its address electrodes 14 form capacitors. When appropriate voltages are applied to mirror 11 and its address electrodes 14, a resulting electrostatic force (attracting or repelling) causes the mirror 11 to tilt toward the attracting address electrode 14 or away from the repelling address electrode 14. The mirror 11 tilts until yoke 17 contacts bus 18.

Once the electrostatic force between the address electrodes 14 and the mirror 11 is removed, the energy stored in the hinges 12 provides a restoring force to return the mirror 11 to an undeflected position. Appropriate voltages may be applied to the mirror 11 or address electrodes 14 to aid in returning the mirror 11 to its undeflected position.

Figure 2:
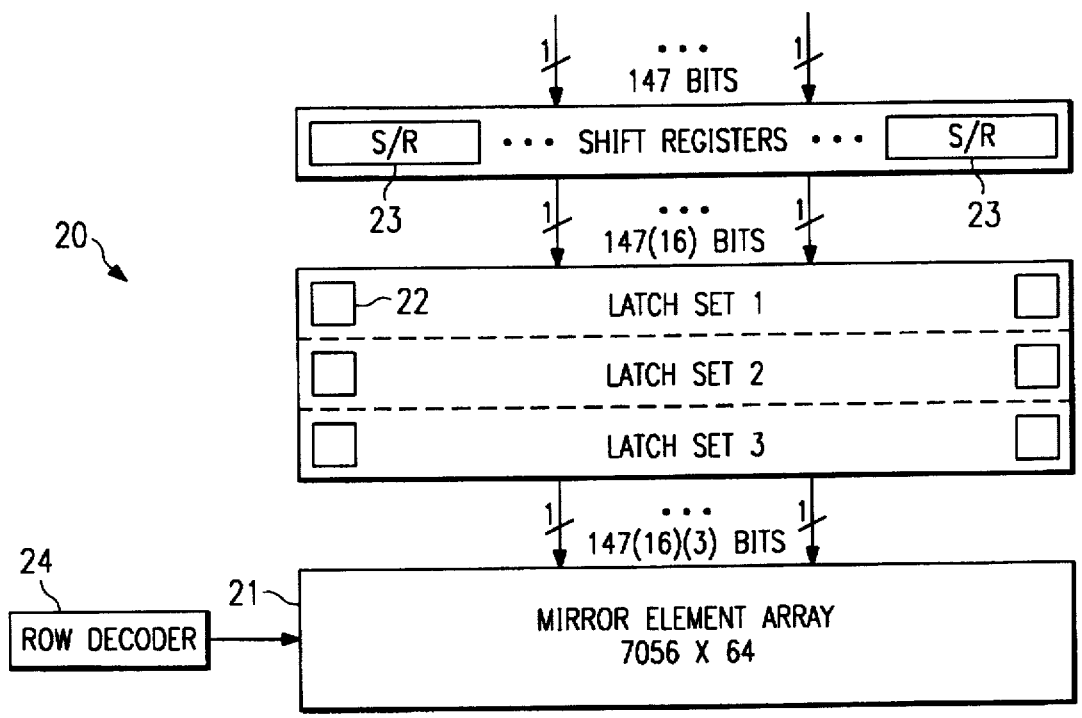
FIG. 2 illustrates a DMD device having a data loading circuit in accordance with the invention.

FIG. 2 illustrates a DMD device 20, comprising a mirror element array 21, latches 22, shift registers 23, and a row decoder 24. As explained below, a number of latches 22 are connected to the same shift register output. The use of multiple latches at each output instead of a single latch, permits the row of shift registers 23 to have a bit storage capacity (the "shift register length") that is shorter than the number of bits per row (the "row length") to be loaded. In the example of this description, three latches 22 are connected to each shift register output. The latches 22 are arranged in three "sets", with each set having a latch from each shift register output.

Mirror element array 21 is an array of mirror elements, such as the mirror elements 10 described above in connection with FIG. 1. In the example of this description, DMD device 20 is used for printer applications, and has a wide mirror element array 21, with 7056 mirror elements per row and 64 rows. As stated above, in the example of this description, each mirror element 10 has its own memory cell 10a.

Data is loaded into mirror element array 21 in a special "bit-plane" format. Instead of being in pixel format, where data is ordered by pixel, then row, then frame, the data is ordered by bit, then row, then bit-plane, then frame. In other words, the primary order of the data is bit-by-bit, with all bits of one bit weight for all pixels being ordered together, then all bits of another bit weight, etc. For example, 8-bit pixel data would be ordered into 8 bit-planes, each bit-plane being comprised of the data for 1 of the 8 bit weights. This permits all mirror elements 10 of DMD device 20 to be simultaneously addressed with an electrical signal corresponding to a 1-bit value loaded to their associated memory cells. The length of time that any one mirror element 10 remains "on" may be controlled in accordance with the bit weight.

The formatting of data in this manner permits a type of pulse width modulation, which permits DMD device 20 to generate greyscale images. For printing applications, further details describing pulse width modulation and the formatting of the data for input to DMD device 20 are set out in U.S. Pat. No. 5,278,652, entitled "DMD Architecture and Timing for Use in a Pulse Width Modulated Display System", assigned to Texas Instruments Incorporated and incorporated by reference herein. For printing applications, further details are set out in U.S. Pat. No. 5,461,411, entitled "Process and Architecture for Digital Micromirror Printer", assigned to Texas Instruments Incorporated and incorporated by reference herein.

Although all mirror elements 10 of array 21 are simultaneously addressed, their memory cells 10a are loaded on a row-by-row basis. This is accomplished with shift registers 23 and latches 22. It is only after all memory cells 10a of mirror element array 21 are loaded that the mirror elements 10 are addressed with their address signals.

During one clock period, each shift register 23 receives 1 bit of data. Thus, for n-bit shift registers 23, the load cycle to fill shift register circuit 23 requires n clock periods.

Figure 3:
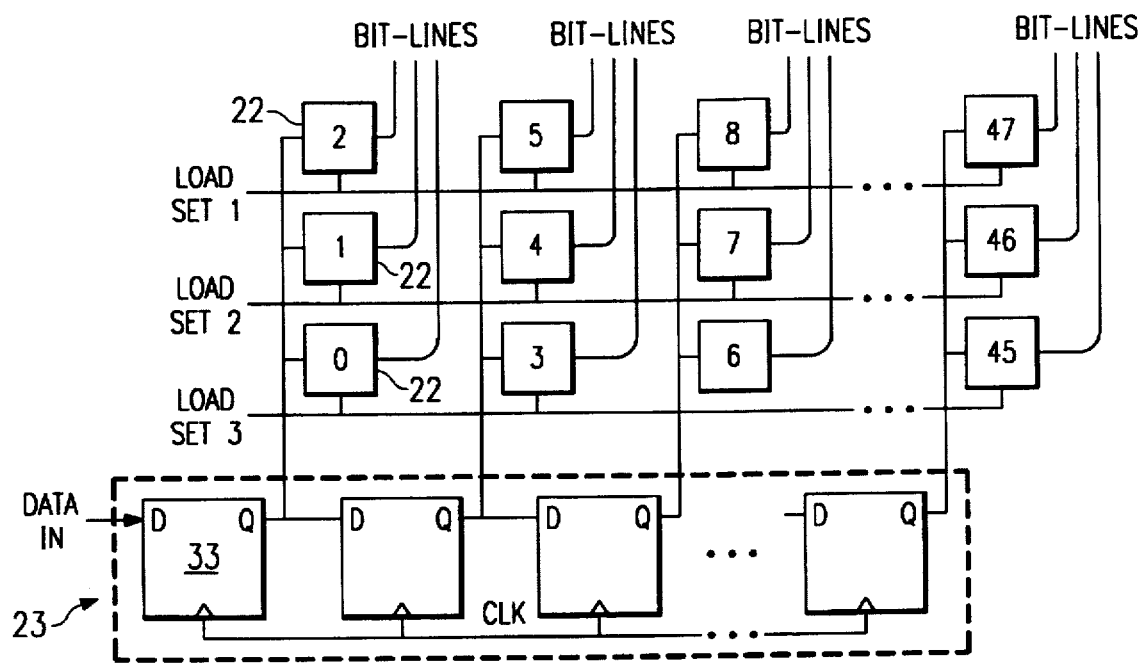
FIG. 3 illustrates a portion of the data loading circuit of FIG. 2 in further detail.

FIG. 3 illustrates one shift register 23 and its associated latches 22. Latches 22 are transparent latches. Shift-registers 23 are comprised of D flip-flops 33 controlled with a common clock signal, CLK.

Referring to both FIGS. 2 and 3, the shift register length is the row length of the data divided by the number of latches 22 connected to each shift register output. In the example of this description, there are three latches connected to each shift register output, so the shift register length is ⅓ the row length. For a row length of 7056 bits, the shift register length is 2352 bits. Also, in the example of this description, shift registers 23 are 16-bit registers. For a total shift register length of 2352 bits, there are 147 shift registers 23.

Each latch 22 is in data communication with a different bit-line of mirror element array 21. Thus, the total number of latches 22 is the same as the row length of the data.

Each shift register 23 and its associated latches 22 provide a 48-bit loading capacity. Thus, in effect although the size of each shift register 23 is only 16 bits, the input "word" size is 48 bits. There need not be a flip-flop 33 for every column of mirror element array 21. In the example of this description, there are ⅓ as many flip-flops 33 as columns.

Each of the three latches 22 connected to each shift register output belongs to a different set of latches 22. Thus, in the example of this description, there are three sets of latches. Each set is controlled by a different load control line, so that after each shift register 23 has been loaded, one set of latches 22 can be selected to receive this data. Although FIG. 3 shows only a single bit-line for each latch 22, for loading the static memory cell 10a of FIG. 1, each latch 22 would deliver a bit value and its complement down two bit-lines. For loading other types of memory cells, a single bit-line per memory cell might be used.

During operation, for loading mirror element array 21, the bit-plane data is ordered by row, and each row is further ordered by word size. In this example, as stated above, the word size is 48 bits.

The sequencing of the data into shift registers 23 is determined by the distribution of the bit-lines. In the example of this description, the bit-lines from the three latches 22 associated with shift register output are distributed to the memory cells 10a for three consecutive pixels of a row. This calls for dividing the word into three portions of alternating bits, specifically, every third bit. However, the bit-lines could be distributed in some other manner that calls for different sequencing, such as three portions of every 16 consecutive bits.

For the alternating-bit sequencing of this description, data input lines deliver 1-bit data in parallel, one bit to each shift register 23. For loading the data for Set 1 of latches 22, each shift register 23 first receives every 48th bit, beginning with bit 47.

FIG. 3 illustrates the input of bits 0–47, where shift register 23 of FIG. 3 is the first shift register and receives the first 48 bits of row data. Each latch 22 is labelled with the bit number of the row data it receives.

Referring to both FIGS. 2 and 3, shift register 23 receives bit 47, with the next shift register 23 receiving bit 95, and each next shift register 23 receiving every 48th bit. In this manner, the row of shift registers 23 receives 147 bits of data at once.

Then, shift registers 23 receive every 48th bit beginning with bit 44. For example, the first shift register 23 receives bit 44, the second receives bit 92, etc. During this time, the load control line for all Set 1 latches 22 is on so that each Set 1 latch 22 receives data from the shift register output to which it is connected. This process continues until the first register 23 has received its 16 bits (bits 47, 44, . . . 8, 5, 2) and all other registers 23 have received 16 bits similarly ordered from Set 1 of the row data.

Then, shift registers 23 receive the Set 2 bits of the same row of data. More specifically, the first register 23 receives its 16 bits (bits 46, 43, . . . 7, 4, 1), and the other shift registers 23 receive their similarly ordered sets of 16 bits. During this time, the load control line for the Set 2 latches 22 is on. Finally, shift registers 23 receive the Set 3 data, with the first shift register 23 receiving 16 bits (bits 45, 42, . . . 6, 3, 0), and each other shift register 23 also receiving 16 bits. During this time, the load control line for the Set 3 latches 22 is on. At this point, the entire 48-bit word has been loaded in three portions of every third alternating bit.

Once each latch 22 receives its data, it holds the data to its bit-line or pair of bit-lines. The bit-lines pass data from each latch 22 down a column of array 21. The data is loaded to the appropriate row of array 21, with the row being selected by row decoder 24. Each memory cell 10a in a row is connected to the same write enable line so that all memory cells 10a in the row are either written with new data or not, depending on the state of the write enable line.

Consistent with the above example, it can be stated in general terms that shift registers 23 receive a first portion of a row of data, which they pass to a first set of latches 22. Each shift register output is connected to a number of latches 22, and each latch 22 is in data communication with a different bit-line. At each shift register output, the latch 22 to receive this first portion of data is selected, thereby resulting in selection of a set of latches 22 for storing this first portion of data. While this set of latches 22 holds its data on its bit-lines, the shift registers 23 receive data for a next portion of the same row of data and pass the data to a next set of latches 22. This continues until the entire row of data has been received into shift registers 23 and passed to latches 22.

It should be understood that the use of 16-bit shift registers is a design choice determined by various factors such as commercial availability of parts, data bandwidth, and clock speed. In theory, there could be a single register 23 with a capacity of 2352 bits that is parallel loaded. Or there could be some other number of n-bit shift registers that are loaded in n cycles.

The configuration of latches 22 permits a reduction in the shift register length required to load one row of data. In the example of this description, the three latches connected to each shift register output increase the loading capacity of each shift register 23 by a factor of three. Where a row of data is 7056 bits long, shift registers 23 need store only store 2352 bits (7056/3) instead of 7056 bits. For this total shift register length of 2352 bits, and using 16-bit registers, there need be only 147 shift registers 23 rather than 441. Alternatively, for a given number of shift registers 23, the size of each shift register could be reduced.

Each D flip-flop 33 of shift registers 23 can be manufactured with a 16-transistor design. Each latch 22 can be manufactured with an 8-transistor design. Because the number of shift registers 23 is decreased by a factor of three, the result is a significant overall decrease in the transistor count.

In other embodiments, DMD device 20 could be configured so that the total shift register length is one-half the row length, with two latches 22 connected to each shift register output. Or, the total shift register length could be reduced to one-fourth the row length, with each four latches 22 connected to each shift register output. In general, the total shift register length could be reduced to any fraction of the row length, with a corresponding configuration of the latches 22.

OTHER EMBODIMENTS

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A spatial light modulator (SLM), comprising:
   an array of pixel-generating elements, each pixel-generating element being individually addressable with data, said array of pixel-generating elements having an associated array of memory cells for storing said data;
   at least one bit-line associated with each column of said memory cells for delivering said data to said column of memory cells;

a row of shift registers for receiving portions of rows of said data from an external source for delivery to said memory cells, said shift register row having a total number of shift registers that is less than the number of said memory cell columns;

a number of latches, wherein each output line of said shift registers is connected to a subset of at least two of said number of latches, wherein each latch is in data communication with a different bit-line of said array;

a row decoder for generating a write signal for selecting which row of said memory array is to receive each said row of data; and a write line in data communication with each row of said memory cells.

2. The SLM of claim 1, wherein there is a one-to-one correspondence between said pixel-generating elements and memory cells.

3. The SLM of claim 1, wherein said pixel-generating elements are divided into groups, each group sharing a single memory cell.

4. The SLM of claim 1, wherein said spatial light modulator is a digital micro-mirror device, and wherein said pixel-generating elements are mirror elements.

5. The SLM of claim 1, further comprising a number of latch control lines, each latch control line in data communication with one latch from each said subset of said number of latches.

6. The SLM of claim 1, wherein said shift registers have a flip-flop for each output of said shift register circuit.

7. The SLM of claim 6, wherein said flip-flops are D-type flip-flops.

8. The SLM of claim 1, wherein each said latch delivers an output and its complement on a pair of said bit-lines.

9. The SLM of claim 1, wherein each said latch delivers said data via a single bit-line to each pixel-generating element.

10. A method of loading data for a row of pixel-generating elements of a spatial light modulator, comprising the steps of:

loading a first portion of a row of data into a row of shift registers, said first portion being comprised of a number of 1-bit data values;

transferring said first portion into a first set of latches, each bit being transferred to a different latch and each latch in data communication with an associated column of said pixel-generating elements;

loading a next portion of said row of data into the same registers of said row of shift registers, said next portion being comprised of 1-bit data values;

transferring said next portion into a second set of latches, each bit being transferred to a different latch and each latch in data communication with an associated column of said pixel-generating elements;

repeating said loading and transferring steps until all of said row of data is loaded into said latches via said row of shift registers.

11. The method of claim 10, wherein said portions are comprised of alternating bits of said row of data.

12. The method of claim 11, wherein said alternating bits are every third bit, and wherein said loading step is performed with said row of shift registers having a length of one-third the length of said row of data.

13. The method of claim 11, wherein said alternating bits are every other bit, and wherein said loading step is performed with said row of shift registers having a length of one-half the length of said row of data.

14. The method of claim 10, wherein each said loading step is performed in a number of clock periods that corresponds to the size of said shift registers.

15. The method of claim 10, and after said repeating step, further comprising the step of enabling a row of said pixel-generating elements so that they are addressed with said row of data.

16. The method of claim 10, wherein said transferring step is performed by transferring all bits of said portion in parallel to said latches.

17. The method of claim 10, wherein said loading step is performed with a flip-flop for each input of said shift registers, and wherein the output of each said flip-flop is in data communication with one latch from each said set of latches.

18. A spatial light modulator (SLM), comprising:

an array of pixel-generating elements, each pixel-generating element being individually addressable with data;

at least one bit-line associated with each column of said pixels for delivering said data to said column of pixels;

a row of shift registers for receiving portions of rows of said data from an external source for delivery to said pixels, said shift register row having a total number of shift registers that is less than the number of said pixel columns;

a number of latches, wherein each output line of said shift registers is connected to a subset of at least two of said number of latches, wherein each latch is in data communication with a different bit-line of said array;

a row decoder for generating a write signal for selecting which pixel row of said array is to receive each said row of data; and a write line in data communication with each row of said pixels.

19. The SLM of claim 18, further comprising a number of latch control lines, each latch control line in data communication with one latch from each said subset of said number of latches.

* * * * *